United States Patent
Watanabe et al.

(10) Patent No.: US 12,331,676 B2
(45) Date of Patent: Jun. 17, 2025

(54) ALTERNATOR

(71) Applicant: TOYOTA JIDOSHA KABUSHIKI KAISHA, Toyota (JP)

(72) Inventors: Ryo Watanabe, Toyota (JP); Toshiyuki Yano, Nagakute (JP); Hisao Fukuhara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/610,690

(22) Filed: Mar. 20, 2024

(65) Prior Publication Data

US 2025/0035036 A1 Jan. 30, 2025

(30) Foreign Application Priority Data

Jul. 27, 2023 (JP) .................................. 2023-122529

(51) Int. Cl.
*F02B 67/06* (2006.01)
*F16H 7/02* (2006.01)

(52) U.S. Cl.
CPC ............... *F02B 67/06* (2013.01); *F16H 7/02* (2013.01)

(58) Field of Classification Search
CPC . F16H 7/02; F16H 57/035; F16H 7/18; F02B 67/06; F02B 61/045; F02B 63/044
USPC ....................................................... 474/144
See application file for complete search history.

(56) References Cited

U.S. PATENT DOCUMENTS

| | | | | |
|---|---|---|---|---|
| 5,370,563 A * | 12/1994 | Yamazaki | ............. | F02B 61/045 440/88 R |
| 5,445,568 A * | 8/1995 | Fukuzawa | ................ | B62J 13/00 474/144 |
| 5,722,360 A * | 3/1998 | Tsunoda | .................. | F02B 75/20 123/195 P |
| 6,338,688 B1 * | 1/2002 | Minami | ................ | F16H 57/035 474/146 |
| 6,383,044 B1 * | 5/2002 | Nemoto | ................ | F02B 61/045 123/195 P |
| 6,655,338 B2 * | 12/2003 | Tsubouchi | ............. | F02M 35/12 123/184.57 |
| 6,766,780 B2 * | 7/2004 | Ikuma | ................ | F02M 35/1288 123/184.53 |
| 7,384,356 B2 * | 6/2008 | Kim | ........................ | B62J 13/04 192/85.5 |

(Continued)

FOREIGN PATENT DOCUMENTS

EP       3591816 A1    1/2020
WO    2018/158870 A1    9/2018

*Primary Examiner* — Henry Y Liu
(74) *Attorney, Agent, or Firm* — SoraIP, Inc.

(57) ABSTRACT

An alternator includes a body portion, a rotating shaft, a pulley, a belt, and a retaining member fixed to the body portion and reducing or eliminating the possibility of the pulley coming off the rotating shaft, wherein the retaining member is located away from the rotating shaft and the pulley in an axial direction of the rotating shaft and opposed to the rotating shaft and the pulley, and a width of the belt in the axial direction is smaller than a width of the pulley in the axial direction, and a distance of the retaining member and the belt in the axial direction is equal to or greater than a width of the pulley in the axial direction, and a distance of the retaining member and the rotating shaft in the axial direction is smaller than a width of the pulley in the axial direction.

2 Claims, 5 Drawing Sheets

(56) References Cited

U.S. PATENT DOCUMENTS

| | | | | |
|---|---|---|---|---|
| 7,471,000 B1* | 12/2008 | Ruiz | .................... | H02J 7/1415 |
| | | | | 320/105 |
| 10,927,753 B2* | 2/2021 | Blank | .................... | F02B 63/044 |
| 11,181,039 B2* | 11/2021 | Blank | .................... | H02K 7/1815 |
| 2002/0025738 A1* | 2/2002 | Nemoto | ................ | F02B 75/22 |
| | | | | 440/77 |
| 2002/0104502 A1* | 8/2002 | Tsubouchi | ....... | F02M 35/10275 |
| | | | | 123/184.57 |
| 2005/0282670 A1* | 12/2005 | Kim | ........................ | B62J 13/04 |
| | | | | 474/144 |
| 2009/0229944 A1* | 9/2009 | Sakuyama | ............. | F16D 13/52 |
| | | | | 192/101 |
| 2013/0337955 A1* | 12/2013 | Ono | ........................ | B62J 13/00 |
| | | | | 474/144 |
| 2015/0259030 A1* | 9/2015 | Nakano | .................... | F16H 7/18 |
| | | | | 474/144 |
| 2016/0123452 A1* | 5/2016 | Modisett | ................ | F16H 55/30 |
| | | | | 474/144 |
| 2020/0173356 A1* | 6/2020 | Blank | .................... | F02B 63/044 |
| 2021/0199048 A1* | 7/2021 | Blank | .................... | H02K 5/26 |

\* cited by examiner

ALTERNATOR

CROSS-REFERENCE TO RELATED APPLICATION

This application claims priority to Japanese Patent Application No. 2023-122529 filed on Jul. 27, 2023, incorporated herein by reference in its entirety.

BACKGROUND

1. Technical Field

The present disclosure relates to alternators.

2. Description of Related Art

In an alternator described in WO 2018/158870, a pulley with a belt wrapped around it and a retaining member for reducing or eliminating the possibility of the pulley coming off a rotating shaft are fixed to the rotating shaft. The retaining member is fixed closer to the distal end of the rotating shaft than the pulley. For example, when a fixing member fixing the pulley to the rotating shaft comes off, the pulley spins freely with respect to the rotating shaft due to the power from the belt. Since the pulley in this state comes into contact with the retaining member, the pulley is unlikely to come off the rotating shaft.

SUMMARY

When such a spinning pulley comes into contact with the retaining member, frictional heat may be generated between the pulley and the retaining member.

It is an object of the present disclosure to provide an alternator that reduces generation of frictional heat while reducing or eliminating the possibility of a pulley coming off a rotating shaft.

The above object can be achieved by
an alternator including:
a body portion;
a rotating shaft rotatably mounted in the body portion;
a pulley fixed to the rotating shaft;
a belt wrapped around the pulley and configured to cooperate with a crankshaft of an engine; and
a retaining member fixed to the body portion and configured to reduce or eliminate a possibility of the pulley coming off the rotating shaft, wherein
the retaining member is located away from the rotating shaft and the pulley in an axial direction of the rotating shaft and faces the rotating shaft and the pulley,
a width in the axial direction of the belt is smaller than a width in the axial direction of the pulley,
a distance in the axial direction between the retaining member and the belt is equal to or greater than the width in the axial direction of the pulley, and a distance in the axial direction between the retaining member and the rotating shaft is smaller than the width in the axial direction of the pulley.

The distance in the axial direction between the retaining member and the rotating shaft may be smaller than a distance in the axial direction between the retaining member and the pulley, and the distance in the axial direction between the retaining member and the rotating shaft may be equal to or greater than the width in the axial direction of the belt.

The distance in the axial direction between the retaining member and the rotating shaft may be greater than a distance in the axial direction between the retaining member and the pulley, and the distance in the axial direction between the retaining member and the pulley may be equal to or greater than the width in the axial direction of the belt.

The distance in the axial direction between the retaining member and the rotating shaft may be equal to a distance in the axial direction between the retaining member and the pulley, and the distance in the axial direction between the retaining member and each of the rotating shaft and the pulley may be equal to or greater than the width in the axial direction of the belt.

The retaining member may be fixed to the body portion in a cantilevered manner.

It is possible to provide an alternator that reduces generation of frictional heat while reducing or eliminating the possibility of a pulley coming off a rotating shaft.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
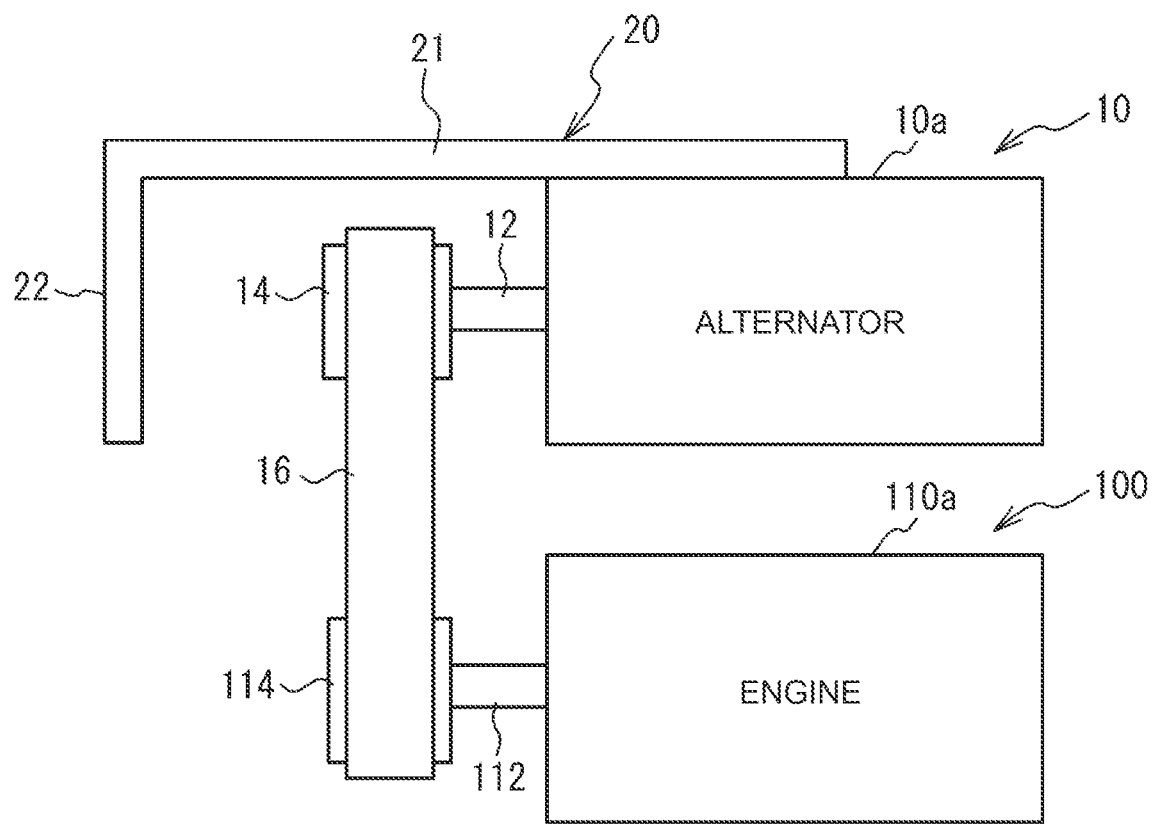
FIG. 1 is a schematic configuration diagram of an alternator.

FIG. 1 is a schematic configuration diagram of the alternator 10. The alternator 10 is a generator that generates electric power by the power of the engine 100. The alternator 10 includes a body portion 10a, a rotating shaft 12, a pulley 14, a belt 16, and a retaining member 20. The rotating shaft 12 is rotatably mounted in the body portion 10a. The pulley 14 is fixed to the distal end of the rotating shaft 12. Engine 100 includes a body portion 110a, a crankshaft 112, and a pulley 114. The crankshaft 112 is rotatably mounted in the body portion 110a. The pulley 114 is fixed to a distal end of the crankshaft 112. The belt 16 is wound around the pulley 14 and the pulley 114. Thus, the rotation of the crankshaft 112 is transmitted to the rotating shaft 12 via the belt 16. As the rotating shaft 12 rotates, electric power is generated in the body portion 10a.

The retaining member 20 is fixed to the body portion 10a in a cantilevered manner. The retaining member 20 is a plate member bent in an L-shape. The retaining member 20 is made of, for example, metal. The retaining member 20 includes a fixed wall portion 21 and an opposing wall portion 22. The fixed wall portion 21 is fixed to the side surface of the body portion 10a by bolts or the like. The opposing wall portion 22 is bent at a substantially right angle from the fixed wall portion 21. The distal end of the opposing wall portion 22 is not fixed to any member.

Figure 2:
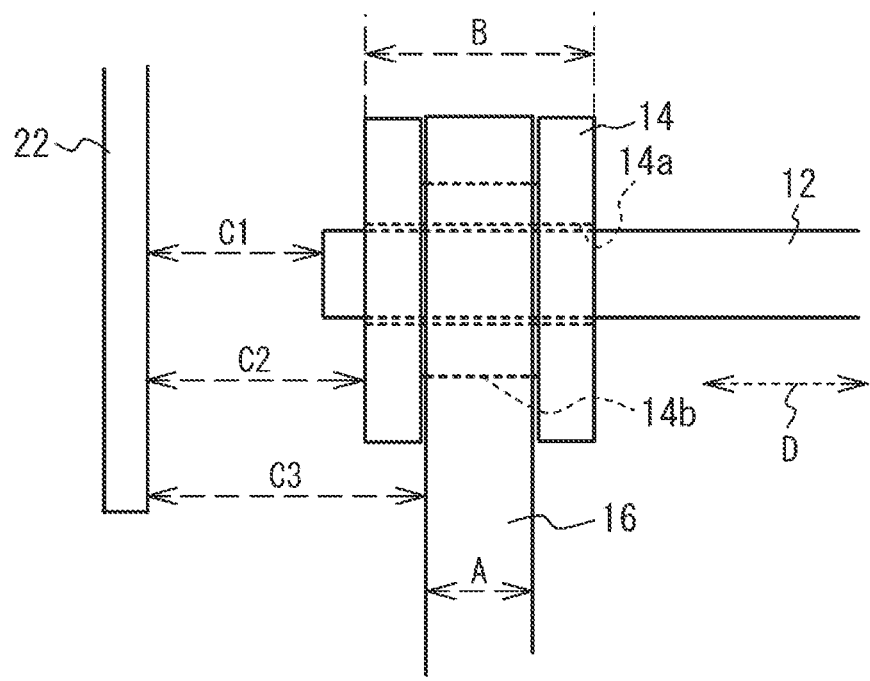
FIG. 2 is an enlarged view of the pulley periphery.

FIG. 2 is an enlarged view of the periphery of the pulley 14. The pulley 14 has a through-hole 14a through which the rotating shaft 12 passes. A groove 14b for holding the belt 16 is formed on an outer peripheral surface of the pulley 14. FIG. 2 shows the pulley 14 secured in a desired position relative to the rotating shaft 12. In an example of FIG. 2, the distal end of the rotating shaft 12 protrudes closer to the opposing wall portion 22 than the pulley 14. The opposing wall portion 22 is located away from the rotating shaft 12 and the pulley 14 in the axial direction D and faces the rotating shaft 12 and the pulley 14.

The width A of the belt 16 in the axial direction D is smaller than the width B of the pulley 14 in the axial direction D. A distance C1 between the opposing wall portion 22 and the rotating shaft 12 in the axial direction D is smaller than a distance C2 between the opposing wall portion 22 and the pulley 14 in the axial direction D. The distance C2 is smaller than the distance C3 in the axial direction D between the opposing wall portion 22 and the belt 16. In the present embodiment, the following first to third conditions are satisfied. The first condition is that the distance C3 is greater than or equal to the width B. The second condition is that the distance C1 is smaller than the width B. The third condition is that the distance C1 is greater than or equal to the width A.

Figure 3A:
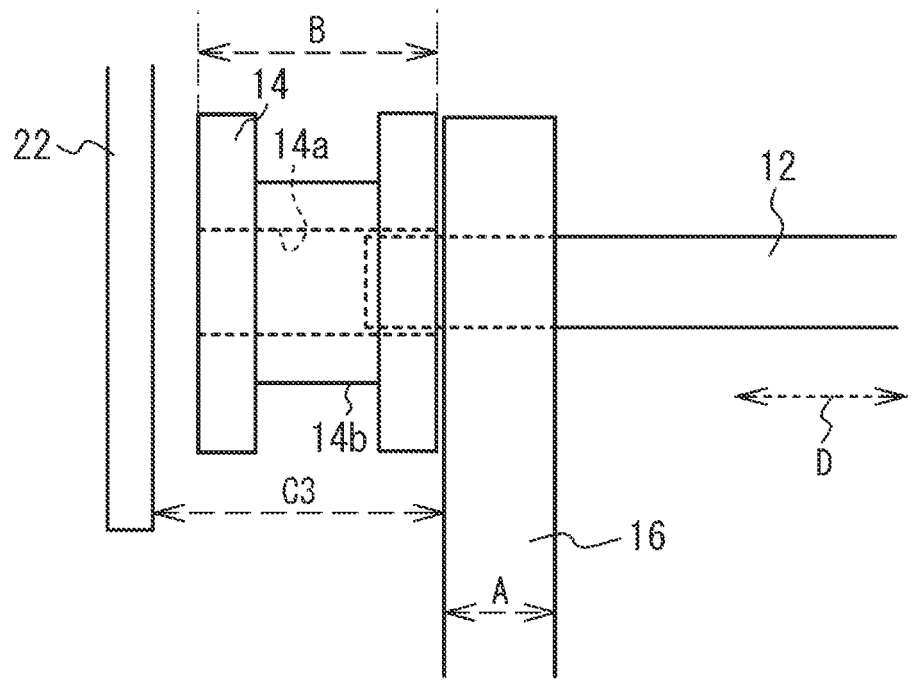
FIG. 3A is a diagram illustrating a state in which the pulley moves toward the opposing wall portion and the belt is detached from the pulley.

When the member fixing the pulley 14 to the rotating shaft 12 comes off, the pulley 14 can move in the axial direction D. For example, it is conceivable that the pulley 14 moves toward the opposing wall portion 22. In this case, according to the first condition, the pulley 14 is allowed to move toward the opposing wall portion 22 without being obstructed by the opposing wall portion 22 to such an extent that the belt 16 comes off the pulley 14. FIG. 3A is a diagram illustrating the pulley 14 having moved toward the opposing wall portion 22 and the belt 16 having come off the pulley 14. When the belt 16 comes off the pulley 14, the power of the engine 100 is not transmitted to the rotating shaft 12 and the pulley 14. Therefore, the rotating shaft 12 and the pulley 14 rotate in inertia, and then stop.

Figure 3B:
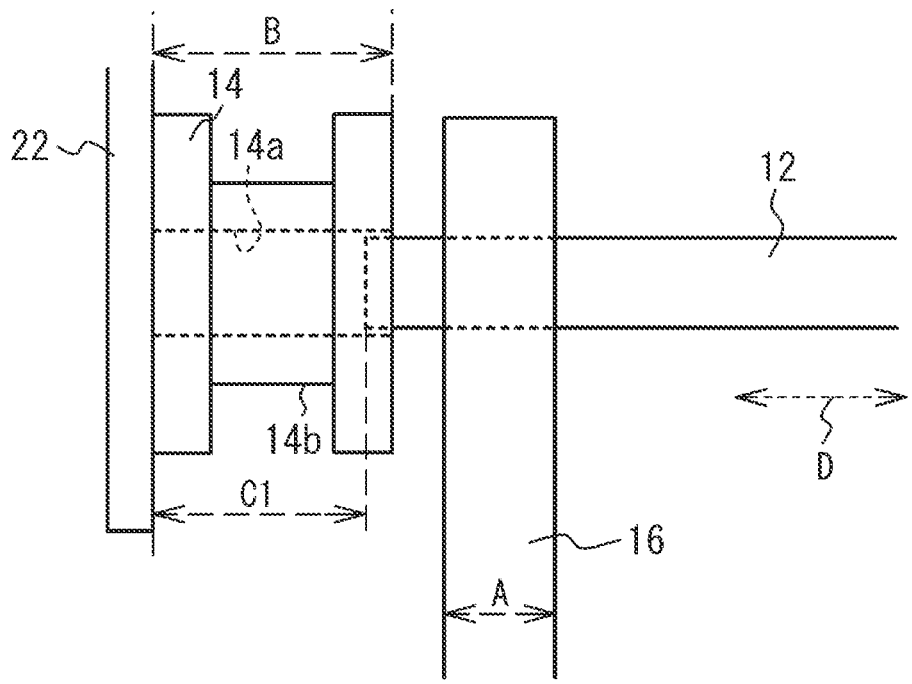
FIG. 3B is a diagram illustrating a state in which the pulley contacts the opposing wall portion.

According to the second condition, since the pulley 14 comes into contact with the opposing wall portion 22, the pulley 14 is unlikely to come off the rotating shaft 12. FIG. 3B is a diagram illustrating a situation where the pulley 14 in contact with the opposing wall portion 22. Here, as described above, the power of the engine 100 is not transmitted to the alternator 10. Therefore, the pulley 14 does not rotate even when the pulley 14 comes into contact with the opposing wall portion 22, and generation of frictional heat between the pulley 14 and the opposing wall portion 22 is reduced.

Figure 4:
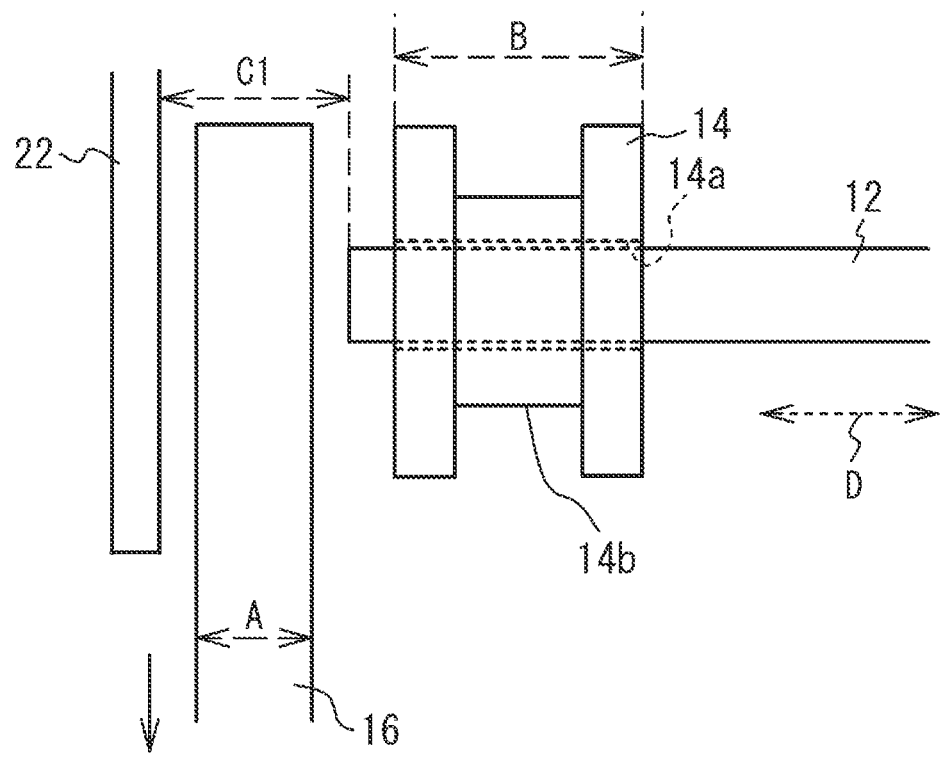
FIG. 4 shows the belt having come off the pulley toward the opposing wall portion.

It is also assumed that the belt 16 comes off the pulley 14 fixed to the rotating shaft 12 toward the opposing wall portion 22 due to a decrease in tension of the belt 16 etc. In this case, according to the third condition, the belt 16 can be detached from the rotating shaft 12 and the pulley 14 without being obstructed by the opposing wall portion 22. FIG. 4 is a diagram illustrating a state in which the belt 16 is detached from the pulley 14 toward the opposing wall portion 22. As a result, contact between the belt 16 and the opposing wall portion 22 is avoided, and generation of frictional heat between the belt 16 and the opposing wall portion 22 is reduced.

Further, the retaining member 20 is fixed to the body portion 10a. For example, as compared with the case where the retaining member is fixed to the rotating shaft 12, the resistance to the rotation of the rotating shaft 12 is reduced. Therefore, a decrease in the power generation efficiency of the alternator 10 is reduced. Further, the retaining member 20 is fixed to the body portion 10a in a cantilevered manner. Therefore, even when the space for attaching the retaining member 20 to the alternator 10 is narrow, the retaining member 20 can be easily attached to the alternator 10.

Modifications

Figure 5A:
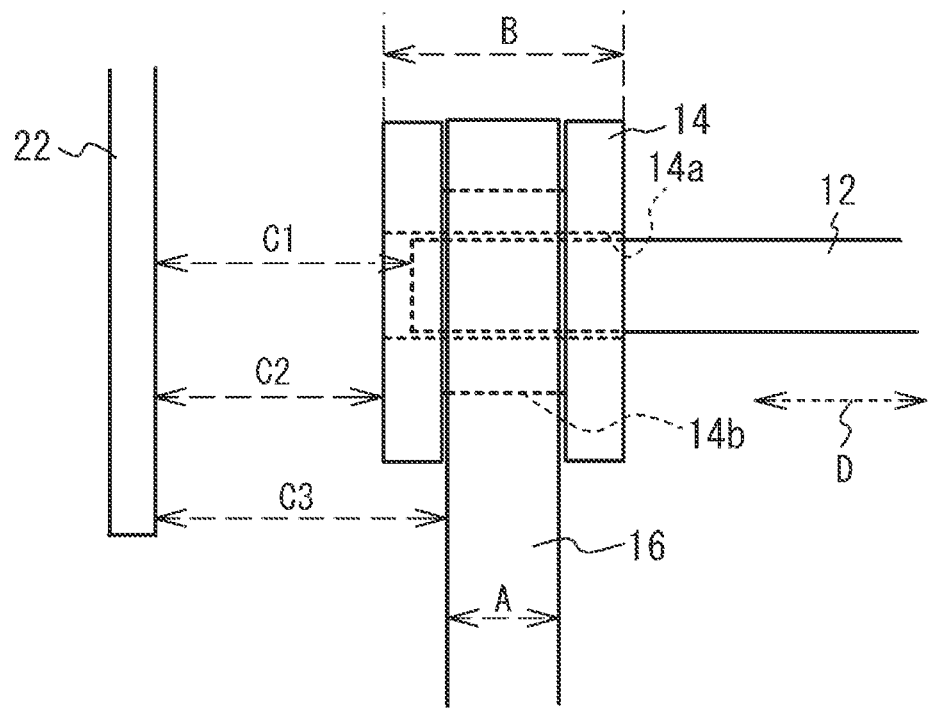
FIG. 5A is an enlarged view of the periphery of the pulley in a first modification.

Next, a plurality of modification examples will be described. Regarding the configuration of the modified example, the same components as those of the above-described embodiment are denoted by the same reference numerals, and redundant descriptions thereof will be omitted. FIG. 5A is an enlarged view of the periphery of the pulley 14 in a first modification. FIG. 5A shows the pulley 14 fixed in a desired position with respect to the rotating shaft 12. In the example of FIG. 5A, the pulley 14 is fixed to the rotating shaft 12 at a position protruding from the distal end of the rotating shaft 12 toward the opposing wall portion 22. Therefore, in the first modification, unlike the embodiment described above, the distance C1 is greater than the distance C2. The first and second conditions in this case are the same in the first modification and the above embodiment. Unlike the above embodiment, the third condition is that the distance C2 is equal to or greater than the width A. As a result, contact between the belt 16 and the opposing wall portion 22 is avoided, and generation of frictional heat between the belt 16 and the opposing wall portion 22 is reduced.

Figure 5B:
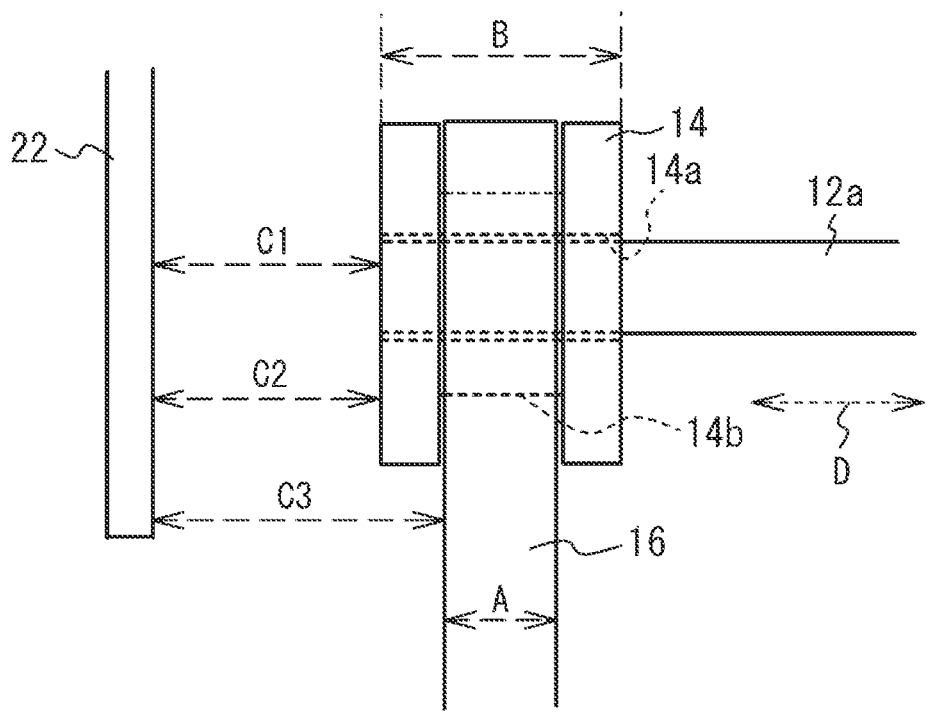
FIG. 5B is an enlarged view of the periphery of the pulley in a second modification.

FIG. 5B is an enlarged view of the periphery of the pulley 14 in a second modification. FIG. 5B shows the pulley 14 fixed at a desired position to the rotating shaft 12a. In the example of FIG. 5B, the pulley 14 is fixed to the rotating shaft 12a so that the surface of the pulley 14 on the opposing wall portion 22 side coincides with the leading end of the rotating shaft 12a. Thus, in the second modification, the distance C1 is the same as the distance C2. The first and second conditions in this case are the same in the second modification and the above embodiment. The third condition is that each of the distances C1, C2 is equal to or greater than the width A. Also in this case, generation of the frictional heat is reduced.

The size of the opposing wall portion 22 in the plane direction perpendicular to the axial direction D need not necessarily be larger than the diameter of the pulley 14. For example, a portion of the opposing wall portion 22 may be included in a region in which the pulley 14 is projected toward the opposing wall portion 22 in the axial direction D. In this case as well, the pulley 14 comes into contact with the opposing wall portion 22, so that the pulley 14 is unlikely to come off the rotating shaft 12.

Although the preferred embodiment of the disclosure is described above in detail, the disclosure is not limited to the specific embodiment, and various modifications and changes may be made within the scope of the disclosure described in claims.

What is claimed is:
1. An alternator comprising:
a body portion;
a rotating shaft rotatably mounted in the body portion;
a pulley fixed to the rotating shaft;
a belt wrapped around the pulley and configured to cooperate with a crankshaft of an engine; and a retaining member fixed to the body portion and configured to reduce or eliminate a possibility of the pulley coming off the rotating shaft, wherein:

the retaining member is located away from the rotating shaft and the pulley in an axial direction of the rotating shaft and faces the rotating shaft and the pulley;

a width in the axial direction of the belt is smaller than a width in the axial direction of the pulley;

a distance in the axial direction between the retaining member and the belt is equal to or greater than the width in the axial direction of the pulley; and a distance in the axial direction between the retaining member and the rotating shaft is smaller than the width in the axial direction of the pulley.

2. The alternator according to claim 1, wherein:

the distance in the axial direction between the retaining member and the rotating shaft is smaller than a distance in the axial direction between the retaining member and the pulley; and the distance in the axial direction between the retaining member and the rotating shaft is equal to or greater than the width in the axial direction of the belt.

* * * * *